(12) United States Patent
Elwalid et al.

(10) Patent No.: US 6,353,616 B1
(45) Date of Patent: Mar. 5, 2002

(54) ADAPTIVE PROCESSOR SCHEDULOR AND METHOD FOR RESERVATION PROTOCOL MESSAGE PROCESSING

(75) Inventors: Anwar I. Elwalid, Murray Hill; T. V. Lakshman, Eatontown, both of NJ (US); Martin May, Sophia Antipolis (FR)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/221,552

(22) Filed: Dec. 28, 1998

Related U.S. Application Data
(60) Provisional application No. 60/086,246, filed on May 21, 1998.

(51) Int. Cl.$^7$ .............................. H04B 7/212
(52) U.S. Cl. ................... 370/443; 370/389; 370/395.2; 370/412; 709/103; 709/105; 709/226
(58) Field of Search ................... 370/443, 522, 370/412, 468, 428, 429, 389, 395.2; 709/103, 104, 105, 226, 241

(56) References Cited

U.S. PATENT DOCUMENTS

| | | | | |
|---|---|---|---|---|
| 5,774,668 A | * | 6/1998 | Choquier | 709/103 |
| 5,915,095 A | * | 6/1999 | Miskowiec | 709/103 |
| 6,167,049 A | * | 12/2000 | Pei | 370/395.2 |
| 6,262,976 B1 | * | 7/2001 | McNamara | 370/389 |
| 2001/0018701 A1 | * | 8/2001 | LiVecchi | 709/105 |

* cited by examiner

Primary Examiner—Brian A. Zimmerman
(74) Attorney, Agent, or Firm—Steve Mendelsohn; Ian M. Hughes

(57) ABSTRACT

A packet network employing a reservation-based protocol system includes routers having processing sections that schedule message processing of the protocol's control messages adaptively based on link utilization. A scheduler of the processing section employs a round-robin scheduling with adaptive weight assignment to allocate processing capacity for control messages. For the RSVP protocol, for example, messages are grouped in classes, and link utilization of the packet flows for each message class is monitored. Weights corresponding to a portion of the processing section's processing capacity are allocated to each message class. The weights are defined based on link utilization for the message class and average message queue length. For processing sections monitoring multiple links, weights are further defined for super-classes based on overall link utilization. Weights may change as link utilization and average message size changes. With defined weights adaptively defined, the processing section then processes each message class in a cyclic, "round-robin" fashion.

15 Claims, 6 Drawing Sheets

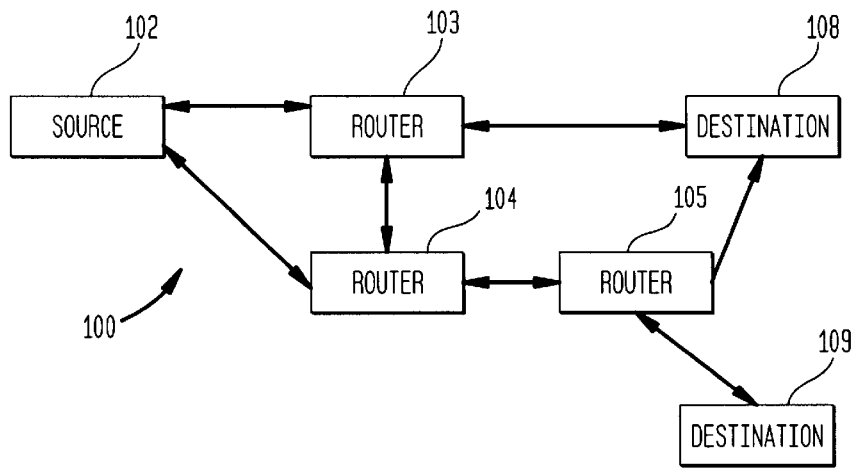
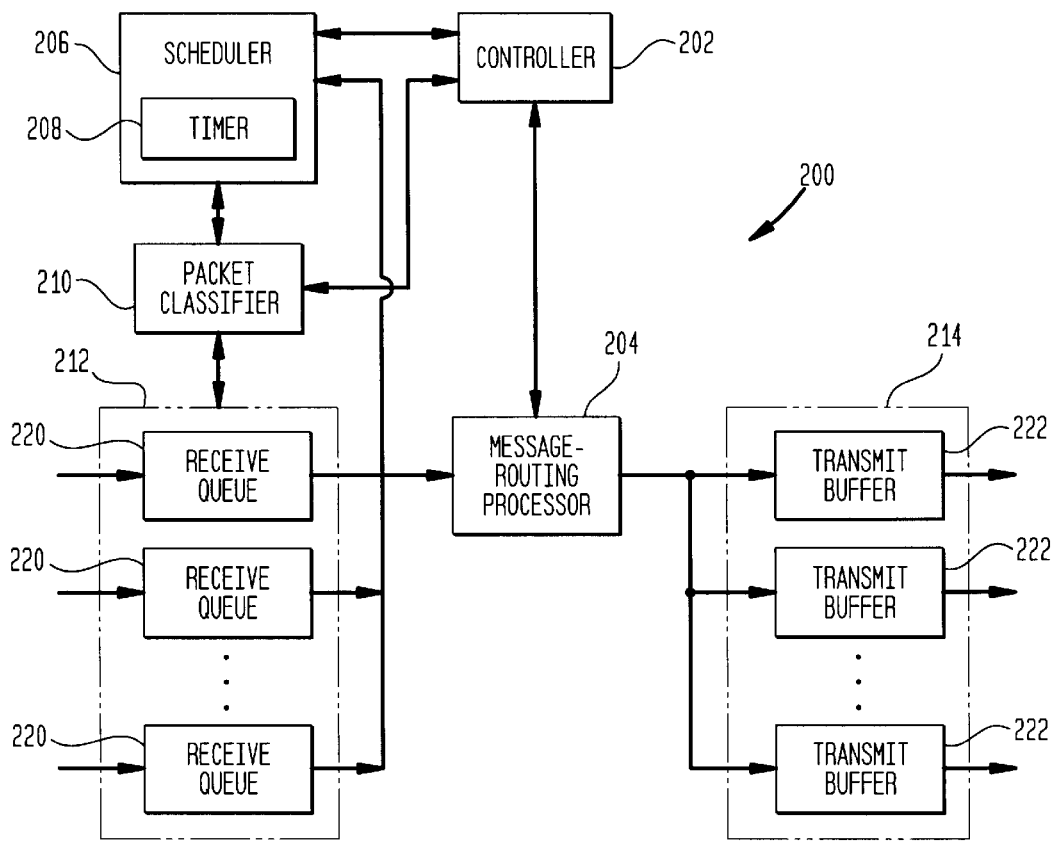

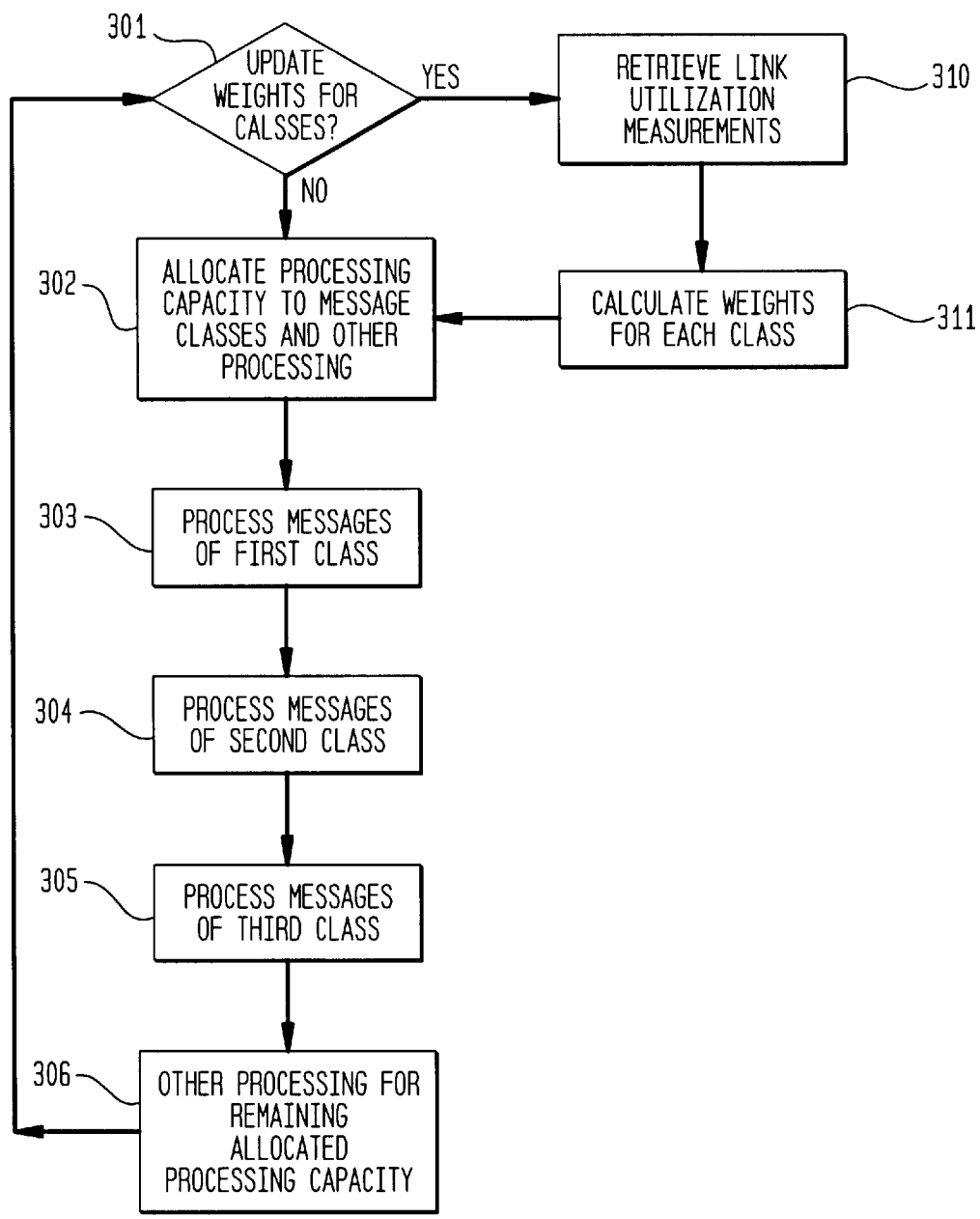

ADAPTIVE PROCESSOR SCHEDULER AND METHOD FOR RESERVATION PROTOCOL MESSAGE PROCESSING

CROSS-REFERENCE TO RELATED APPLICATIONS

This application claims the benefit of the filing date of U.S. provisional application No. 60/086,246, filed on May 21, 1998.

BACKGROUND OF THE INVENTION

1. Field of the Invention

The present invention relates to packet networks, and, more particularly, to scheduling of control protocol message processing by a router.

2. Description of the Related Art

Packet networks, such as Internet Protocol (IP) based networks, are increasingly providing differentiated services. One approach for providing differentiated services employs type-of-service (TOS) bits defined in the packet header. Routers within the packet network interpret the TOS bits in a predetermined manner so as to provide the differentiated services. Another approach, which is a reservation-based approach, employs control messages to reserve network resources for the duration of a connection defined by a packet flow, or packet flow aggregates ("flows"). For this reservation-based approach, a protocol that may be employed to signal reservation of network resources is the Reservation Setup Protocol (RSVP). RSVP, as an example, may be used in conjunction with service models, such as guaranteed rate and controlled load service models, to request a desired quality of service (QOS) for certain packet flows.

RSVP is a receiver-oriented resource reservation protocol: reservations are initiated when a source (sender) requests a resource reservation, such as a reservation for a certain amount of bandwidth of a transmission line or logical link during connection set-up or during an established connection. This RSVP request is signaled through the network using a PATH message. The PATH message is routed along the network to its destination (or set of destinations) through a series of routers in a similar manner to that of other IP packets. However, before propagating a PATH message, each router checks if sufficient requested resources are available. If the requested resources are available, the router first establishes a flow-state for the packet flow (or aggregated flows) indicated by this request and then propagates the PATH message. The packet flow in progress is maintained by periodic UPDATE messages generated by the source. Also, each intermediate router, and the destination, starts a counter, or refresh timer, that is employed to generate a processor interrupt causing termination of the packet flow if no RESV or UPDATE messages are received for the packet flow before timer expires.

When the PATH message reaches the desired destination (recipient), the destination sends back a RESV message through the network to the source. The RESV message may be, for example, a bandwidth request that may be different from the bandwidth requested in the PATH message. When an intermediate router of the network receives a RESV message for which there is an established packet flow for a connection, the intermediate router commits the requested bandwidth to the packet flow. From the point-of-view of this intermediate router, the packet flow is now in progress. Each PATH and RESV message received by the intermediate router, and destination, resets the refresh timer. Periodic UPDATE messages are generated by the source and received by each router. Each router, upon processing of UPDATE messages, resets its refresh timer and propagates the UPDATE message. A packet flow is terminated, the connection torn-down, and the reserved resources released by an intermediate router (or the destination) when either an explicit TEAR-DOWN message generated by the source or destination is received, or when a refresh timer expires.

RSVP facilitates exchange of resource reservation information among routers in the packet network and is a soft-state protocol which relies upon periodic refresh message requests (UPDATE messages) to maintain router state information. Refresh messages that are not sent or processed within the period cause the established packet flow to be terminated. The periodic refresh messages, and consequent soft state information in the routers, permit the RSVP protocol to operate robustly in the presence of packet flow route changes and lost signaling messages, without requiring explicit messages to terminate the packet flow. Soft state protocols, such as RSVP, allow packet networks to provide services comparable to those in virtual circuit networks with explicit connection establishment and termination.

However, the processing section of each router must process the periodic refresh messages. Router processing load increases with the number of established RSVP packet flows passing through the router, even if these RSVP packet flows are not actively sending packets. The RSVP message load offered to the processing section comprises i) message requests due to RSVP reservation connection establishment and termination and ii) message requests due to refresh messages generated by established RSVP packet flows. Even though refresh messages consume a relatively small capacity of the processing section, the offered processor load due to refresh messages increases as the number of in-progress RSVP packet flows increases through the router. Even if an "adequate" control processor with capacity determined by traffic engineering rules is employed in the processing section, temporary overloading of the control processor may occur. Such temporary overloading may result from a "mass call-in" that generates a relatively large number of new reservation message requests for connection establishment or termination within a relatively short period of time. In addition, the control processor does not necessarily process RSVP message requests alone, but may also handle other routing tasks. With a burst of routing instabilities, and recalculations of network routes, for example, these routing tasks may require considerable portion of available processing capacity, causing a bottleneck in processing of RSVP message requests. Consequently, reservation blocking is possible even though link capacity may be available.

Appropriate scheduling of message processing by the processing section may be used to maximally utilize the link capacity within the constraints of the available processing resources. For example, consider the case when the link-utilization is relatively high. Processing PATH or RESV messages before processing TEAR-DOWN messages is not advantageous since available bandwidth is unlikely to satisfy these new requests. Therefore, for the high-link utilization case, processing TEAR-DOWN messages in the router's queue before processing PATH messages is beneficial. However, routers of the prior art employ scheduling that is not link sate dependant, such as First In First Out (FIFO) processing. Similarly, for the case when link-utilization is relatively low, processing of TEAR-DOWN messages may be deferred, allowing scarce processing resources to process new PATH and RESV messages. However, this deference is similarly not adopted by FIFO scheduling. Furthermore, giving priority to UPDATE message processing is desirable since deferment of UPDATE message processing may result in expiration of the refresh timer, and so terminate the packet flow, in the router or in downstream routers.

SUMMARY OF THE INVENTION

The present invention relates to allocation of processing capacity to processing control messages of a router in a packet network. A link utilization value of a link coupled to the router is monitored, and a message request size and a corresponding weight for at least one class of control messages are calculated. Each weight is calculated based on the link utilization value and the message request size of each class. A portion of the processing capacity of the router is allocated for each class of control messages based on the corresponding weight of the class.

BRIEF DESCRIPTION OF THE DRAWINGS

Other aspects, features, and advantages of the present invention will become more fully apparent from the following detailed description, the appended claims, and the accompanying drawings in which:

FIG. 1 shows block diagram of a packet network employing a round-robin scheduling method with adaptive, weighting assignment in accordance with the present invention;

FIG. 2 shows a block diagram of an exemplary embodiment of a processing section of a router employing a scheduling method in accordance with the present invention;

FIG. 3 shows a flow chart of an algorithm implementing a round-robin scheduling method with adaptive weighting assignment employed by a scheduler of FIG. 2;

DETAILED DESCRIPTION

Figure 4A:
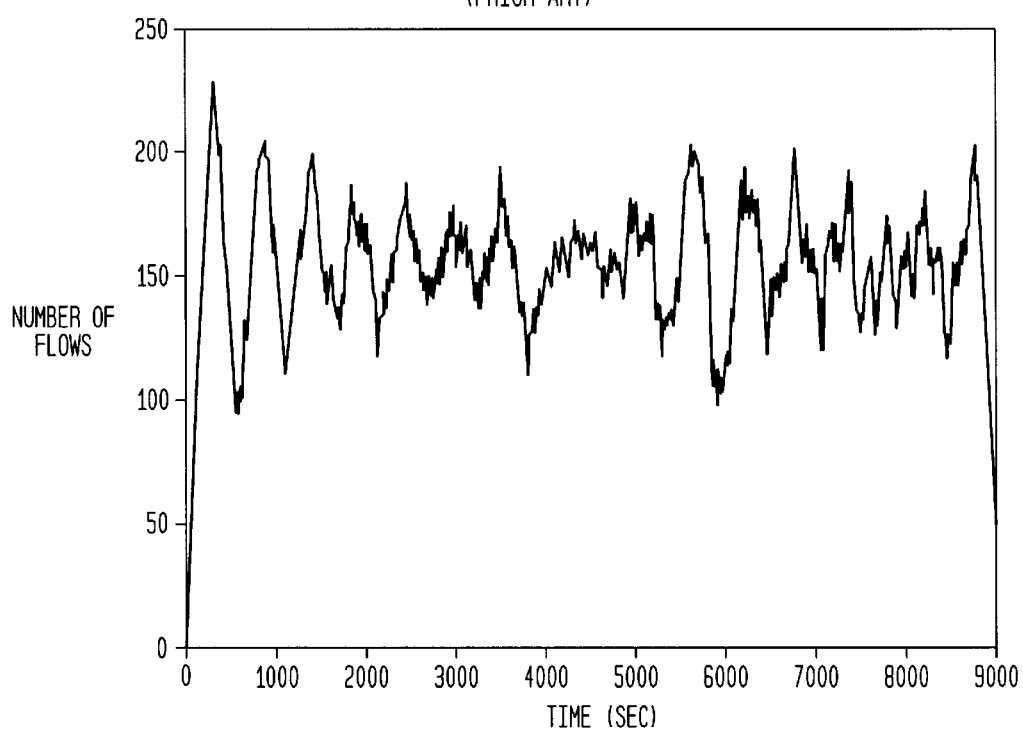
FIG. 4A shows a number of flows for relatively low processor load without router refresh timer expiration in accordance with a scheduling algorithm of the prior art.

FIG. 1 shows block diagram of a packet network 100 employing a round-robin scheduling method with adaptive weighting assignment in accordance with the present invention. The packet network 100 includes a source 102 in communication with destinations 108 and 109 through routers 103, 104 and 105. The packet network 100 employs a reservation-based protocol, such as RSVP, to allocate packet flows from the source 102 to one or more of the destinations 108 and 109 through routers 103, 104, and 105. The routers 103, 104 and 105 and destinations 108 and 109 employ scheduling of processing capacity of corresponding processing sections allocated to message requests of the reservation-based protocol. For the following description of exemplary embodiments, the packet network 100 employs the reservation-based protocol RSVP, although the present invention is not so limited.

A connection that establishes packet flows between source 102 and at least one destination 108 and 109 may be set up by message requests in the following manner. The source 102 desires to establish a packet flow with, for example, destination 108. The source 102 generates a PATH message requesting, for example, a connection having a specified amount of bandwidth. The PATH message is routed through the network by routers 104 and 105, for example, to destination 108. Before propagating the PATH message, each router 104 and 105 checks if sufficient requested bandwidth resources are available. If the requested resources are available, router 104 first establishes a soft state for the packet flow indicated by this request and then propagates the PATH message to router 105. Routers 104 and 105 start respective refresh timers for the packet flows that cause termination of the packet flow when no RESV or UPDATE messages are received before the refresh timer expires.

When the PATH message reaches destination 108, destination 108 sends back a RESV message through the routers 105 and 104 to the source 102. The RESV message may include, for example, a message request for bandwidth reservation that may be different from the bandwidth reservation message request of the PATH message. When routers 104 and 105 receive the RESV message, each router 104 and 105 commits the requested bandwidth to the packet flow, if available. Once the RESV message reaches source 102, the connection is established. Each PATH and RESV message received by routers 104 and 105 resets the corresponding refresh timer. The connection is maintained by periodic UPDATE messages generated by the source 102 and destination 108. Each router 104 and 105, upon processing of an UPDATE message, resets the corresponding refresh timer and propagates the UPDATE message. The connection may either be terminated when an explicit TEAR-DOWN message generated by the source 102 or destination 108 is received, or when the refresh timer of the router 104 or 105 expires.

FIG. 2 shows a block diagram of a processing section 200 of a router, such as routers 103–105, employing a round-robin scheduling method with adaptive weighting assignment in accordance with the present invention. The processing section 200 includes controller 202, message-routing processor 204, scheduler 206 having timing section 208, and packet classifier 210. Further included is the input queue 212 having receive queues 220 for each transmission line terminated by the router, and output buffer 214 having transmit buffers 222 for each output transmission line of the router. Each transmission line supports message or other logical traffic for one or more connections, which support may be defined as a link.

Packet classifier 210 of processing section 200 may be employed for processing of control or other system signaling type messages. Packet classifier 210 may further be part of a packet-classifier processing module that also classifies data packets for traffic routing purposes. As described below, the term "packet" may indicate a control message, but may also be a portion of a control message, since control messages may be formed from several packets.

Packets received by the router are stored in input queue 212. Packet classifier 210 monitors each packet of the input queue 212, applying, for example, a packet filter to each packet to determine the type of packet to identify control messages. PATH, RESV, UPDATE and TEAR-DOWN messages, for example, are identified as control messages by the packet classifier 210 and reported to the scheduler 206 and controller 202. Controller 202 processes each control message based on, for example, header information and or/message type to determine how to process the control message to establish, maintain or tear-down a connection. Message-routing processor 204, in accordance with signals of controller 202, transfers packets stored in the input queue 212 to a corresponding output transmission line.

Scheduler 206, upon receiving notice of a PATH, RESV, UPDATE and TEAR-DOWN message from packet classifier 210, begins a corresponding counter of timing section 208. This counter may be provided as, for example, a refresh timer for a corresponding packet flow. If the counter of timing section 208 expires, an action, such as dropping the corresponding packet of the input queue 220, is performed. The scheduler 206 also allocates processing capacity of controller 202 with a round-robin scheduling method with adaptive weighting assignment in accordance with the present invention. Briefly, the PATH, RESV, UPDATE and TEAR-DOWN messages are each a priori assigned to a class. Scheduler 206 then allocates portions of the processing capacity of the processing section 200 to each of these classes based on link utilization. The PATH, RESV, UPDATE and TEAR-DOWN messages are processed by controller 202 in accordance with the allocated processing capacity and, hence, subsequently routed by message-routing processor 204.

The weights are calculated by a processor, which may be a processor of the controller 202 or of the scheduler 206. For convenience, the processor of the scheduler 206 of the exemplary embodiment calculates the weights at predetermined intervals in time and also allocates processing capacity, although the present invention is not so limited. The processor may also calculate average message request size, which may be defined as the average requested quality of service (QoS) metric. The QoS metric may be an average reserved bandwidth requested by the RSVP signaling messages, but other QoS metrics may be employed that may be related to link bandwidth. For example, minimum bandwidth, transmission delay, or probability of lost packet. The method by which weights are calculated is described subsequently with respect to FIG. 3.

To allocate portions of processing capacity for message processing by the controller 202, a monitoring circuit to monitor link utilization may be included in the router. Such monitoring circuit may be included in the controller 202, scheduler 206 or input queue 212, However, the function of this circuit may be distributed in whole or in part in other circuitry within the router (e.g., in transmission line termination cards not shown in FIG. 2). For the exemplary embodiment of FIG. 2, the monitoring circuit may be included in the scheduler 206. The scheduler 206 desirably monitors link utilization as, for example, traffic, the fraction of the link capacity in use. Such monitoring may include, for example, determining an average number of PATH, RESV, UPDATE and TEAR-DOWN messages received, number of established connections, average packet length, or average time in the receive queue 220. Alternatively, message-routing processor 204 and controller 202 may monitor link utilization of each transmission line.

The round-robin scheduling method with adaptive weighting assignment as applied to the PATH, RESV, UPDATE and TEAR-DOWN message processing is now described. To simplify the following description of the preferred embodiment, refresh timers are set to fixed values that are at least an order of magnitude larger than typical round-trip times. As would be apparent to one skilled in the art, however, time adaptation mechanisms may be employed for the refresh timers. An initial model for the processing section 200 of each router 103–105 may be as follows. The processing section 200 services each logical interface of a transmission line. RSVP signaling message requests arriving over the logical interface are provided to the processing section 200 and placed in input queue 212 for further processing. A service discipline for the queue is FIFO with no distinctions made between the different message types except for weighted scheduling of the RSVP signaling message requests in accordance with the present invention.

Instead of FIFO processing of RSVP messages, weighted scheduling in accordance with the present invention processes each message type with assigned portions of processing capacity based on a priori traffic statistics, or link utilization. Weighted scheduling of the processing section 200 may be defined as an allocation of predetermined amount, or percentage, (the "weight") of overall processing capacity of the processing section 200 to a message class. This processing capacity may be the processing capacity of controller 202, but other schemes may be employed. For example, signaling message requests may be classified into just three classes: PATH & RESV messages, UPDATE messages and TEAR-DOWN messages. Messages of each class are weighted by allocating the processing capacity (e.g., percent of processing time of the processor section) to process messages of each class in FIFO manner. "Round-robin" may be defined as switching the processing by the controller between the classes (i.e., switching the message processing) in a predetermined, cyclic order.

An immediate disadvantage of using fixed weights is the difficulty of choosing an appropriate weight for processing of UPDATE messages. The UPDATE message traffic increases in proportion to the number of RSVP packet flows already established. Moreover, if UPDATE messages are lost due to insufficient assigned weight, then existing flows may be unnecessarily torn down. Giving priority to UPDATE messages and round-robin scheduling with fixed weight processing amongst the other classes may improve performance. Round-robin scheduling with fixed weight processing, however, has further disadvantages. For example, if the message load (traffic) of UPDATE messages is very high due to a very large number of established packet flows, then the TEAR-DOWN messages may not be processed adequately. Hence, packet flows that should be torn down may last longer than necessary, increasing link utilization while preventing new packet flows from having reservation requests processed, and so connections established. Furthermore, the fixed-weight round-robin method does not account for link utilization, even though knowledge of link utilization may be used to increase the probability that message requests will be processed in a satisfactory manner.

In accordance with the present invention, round-robin scheduling with adaptive weighting assignment employs knowledge of link utilization to increase performance of message processing of each link, under varying traffic conditions. For simplicity, scheduling for three classes of service is described, although the present invention is not so limited. PATH & RESV messages are assigned to a first class, UPDATE messages are assigned to a second class, and TEAR-DOWN messages are assigned to a third class. Corresponding weights may be denoted as $w_{PR}$ for PATH &

RESV messages, $w_{UD}$ for UPDATE messages, and $w_{TD}$ for TEAR-DOWN messages. As described previously, when the counter of timing section 208 expires, an interrupt is generated for the controller 202 to terminate a respective packet flow. High priority may be assigned to these interrupts and these interrupts do not queue as TEAR-DOWN messages.

A single level scheme of round-robin scheduling with adaptive weighting assignment is now described for a case when, for example, the input queue 212 employs a single receive queue 220 of a single link (FIG. 2). An average reservation message request size, expressed in fraction of link capacity, for PATH & RESV messages is defined as $PR_{ave}$ bits/sec. As defined herein, "size" may be the average size or amount of bandwidth, or other form of capacity (related to bandwidth) requested by the messages. The average reservation message request size $PR_{ave}$ may be computed as known in the art with an exponential smoothing model and with a forget factor $\alpha_{PR}$ selected to track message request size over time-scales of the order of a few hundred packet inter-arrival times. Similarly, an average termination (or "tear-down") message request size, expressed in fraction of link capacity, for TEAR-DOWN messages is defined as $TD_{ave}$. The value for $TD_{ave}$ may be similarly computed with a corresponding forget factor $\alpha_{TD}$. Link utilization, or utilized link capacity, is denoted as Ubits/sec, and $n_{PR}$ is defined as $(1-[U/PR_{ave}])$ and $n_{TD}$ is defined as $(U/TD_{ave})$. The weight $w_{PR}$ for processing PATH and RESV messages is now calculated as in equation (1)

$$w_{PR} = \frac{n_{PR}}{(n_{PR} + n_{TD})} \quad (1)$$

Similarly, the weight $w_{TD}$ for processing TEAR DOWN messages is calculated as in equation (2)

$$w_{TD} = \frac{n_{TD}}{(n_{PR} + n_{TD})} \quad (2)$$

Although equations (1) and (2) are shown with processing time for the three message types being the same, as would be apparent to one skilled in the art, processing time may be different in practice. However, the weights calculated from equations (1) and (2) may be scaled proportionally to the processing times.

The weights that are calculated in the equations (1) and (2) do not include a factor for the arrival rates of packets into the input queue 212. If it is desired to account for the arrival rates to input queue 212, then average queue length may be employed as the factor. Weights may be computed by adding the average queue length to $n_{PR}$ for the PATH & RESV message class, and then by adding the average queue length to $n_{TD}$ for the TEAR DOWN message class. Weights assigned to the classes are then computed as in equations (1) and (2).

The weight $w_{UD}$ for processing of UPDATE messages may be calculated in a similar manner to that given in equations (1) and (2) by defining an average update message size for UPDATE messages as $UD_{ave}$, forget factor $\alpha_{UD}$, $n_{UD}$ as $U/UD_{ave}$ and modifying equations (1) and (2). However, a preferred embodiment may set the weight of UPDATE message processing based on current link utilization of established packet flows. Since the UPDATE message traffic increases in proportion to the number of RSVP packet flows already established, the weight $w_U$ for processing of UPDATE messages may be adaptively varied based on the number of established RSVP packet flows in progress for the link. Therefore, the weight $w_{UD}$ may be as given in equation (3):

$$W_{UD} = \xi(\% \text{ of U for established RSVP packet flows}) + C \quad (3)$$

In equation (3), $\xi$ is a scaling factor that may be experimentally optimized, and C is a constant to account for arrival rates based on queue length. Fixed priority to UPDATE messages and round-robin scheduling with adaptive weighting assignment amongst the other classes may also be employed.

As given by equations (1) and (2), a weight assigned to PATH and RESV messages is increased when U is small. The value for U may be small, for example, when reservation message request sizes are small and when the link utilization is low. Therefore, for low utilization, a scheduling method assigning weights in accordance with the present invention increases the rate at which PATH and RESV messages are processed. This increase in rate occurs since delaying processing of TEAR-DOWN messages does not affect link utilization. Similarly, when the value for U is large, the link utilization is very high and the scheduling system processes TEAR-DOWN messages at a higher rate, thereby decreasing the probability that the next PATH or RESV message is blocked.

In accordance with another exemplary embodiment of the present invention, processor scheduling for multiple links corresponding to multiple receive queues 220 of the input queue 212 shown in FIG. 2 may be employed. Processor scheduling for the case of multiple links employs a double-level hierarchical scheme of round-robin scheduling with adaptive weighting assignment instead of the single-level scheme such as described with respect to equations (1)–(3). At a high level, a super-class is defined for each link and processing capacity allocated to each link based on the corresponding weight of the super-class At a low level for each super-class of a link, the same message class definitions and weights are employed as in the single-level scheme described previously.

Links$j=\{1,2, i, \ldots, n\}$ (j, i, and n each an integer) are associated with the processing section 200. Weights for the lower classes associated with each super-class are calculated in the same manner as described above with respect to equations (1) and (2). The weights for the low level class of link i are denoted by $w^i_{PR}$ and $w^i_{TD}$. For each super-class of link i, the super-class weight $W_i$ is computed as in equation (4)

$$W_i = \frac{w^i_{PR} + w^i_{TD}}{\sum_{j=1}^{n} w^j_{PR} + \sum_{j=1}^{n} w^j_{TD}} \quad (4)$$

The low level weights $w^i_{UD}$ for UPDATE message processing of each link i are determined as described above with respect to equation (3). However, the low level class weights $w^i_{UD}$ for UPDATE messages may also be calculated in a similar manner to that described for equations (1) and (2) described previously. However, for the double-level scheme the update weights $w^i_{UD}$ should then be included in equation (4) for the super-class weight $W_i$.

For this exemplary embodiment employing a double-level scheme, when a link is highly utilized (experiencing a high blocking), or a link is lightly utilized (wasting bandwidth which could be used if the processor were not a bottleneck) then one of the assigned lower-class weights of the link is high. If other links are not in these extreme situations, then the assigned weights of the other links are not as high. Hence, the super-class weights tend to give a higher share of the processor to links which are at the extremes of utilization and have a backlog of messages to be processed. This weighting assignment enforces a fairness of processing allocation between the links. Note that if one link has a large number of reservation message requests with small size while another link has a small number of reservation message requests with large size, then the former link gets a higher super-class weight. Also, link speeds may differ since, during weight computation, link speeds and message request sizes may be normalized.

Alternative embodiments of the present invention may employ any number of modifications to the adaptive determination of weights to further account for characteristics of the packet network. For example, queue content may be included and so this information may be employed to bias the scheduling method according to message classes with longer queues, or weights may be determined only according to the queue-length of each message class. Further, weights may be multiplied by the normalized work accumulated in the corresponding message queues of the receive queues 220.

FIG. 3 shows a flow chart of algorithm for implementing the round-robin scheduling method with adaptive weighting assignment in accordance with the present invention employed by the scheduler 206 of a router. The flow chart as shown in FIG. 3 is exemplary only. As would be apparent to one skilled in the art, the basic steps may be augmented, or the steps separately implemented in two or more processing sections of the router. In addition, the flow chart of FIG. 3 does not show the effect of expiration of a refresh timer, which effect may be implemented by employing an interrupt when the refresh timer expires for immediate processing of the connection termination.

Referring to FIG. 3, first, at step 301, the scheduler algorithm determines whether weights for the classes should be updated. If so, the scheduler algorithm moves to step 310; otherwise, the scheduler algorithm moves to step 302 using, for example, weights for the assigned classes previously determined in step 311 (described subsequently). This test of step 301 may be employed in a manner such that the weight assignment method adaptively changes the weights over a reasonably short time, but also occurs relatively infrequently so as to not burden the controller or other processor of processing section 200.

If, at step 301, the scheduler determines that the weights should be updated, then, at step 310, link utilization measurements are retrieved for the link or links, the individual classes of each link, and/or, if employed, the super-classes of the links. Next, at step 311, the weights are calculated in a manner similar to that of the exemplary calculations of equations (1)–(4), and then the algorithm moves from step 311 to step 302.

At step 302 the scheduler algorithm determines processing capacity allocated to processing messages for each of the assigned classes (e.g., PATH & RESV, UPDATE, and TEAR-DOWN messages) based on the corresponding weights. Then, the scheduler algorithm moves to step 303 to process messages of the first class.

At step 303, the processing section processes messages of the first class in the receive queue 220 for a portion of allocated processing capacity based on the calculated weight for the first class. For example, PATH and RESV messages may be processed. The allocated portion may be a portion of the total processing capacity as measured in, for example, processor cycles, time, number of packets, or other measure of processing as known in the art. Once the allocated portion is exhausted, the scheduler algorithm moves to step 304.

At step 304, the processing section processes messages of the second class in the receive queue 220 for a portion of allocated processing capacity based on the calculated weight for the second class. For example, UPDATE messages may be processed. Once the allocated portion is exhausted, the scheduler algorithm moves to step 305.

At step 305, the processing section processes messages of the third class in the receive queue 220 for a portion of allocated processing capacity based on the calculated weight for the third class. For example, TEAR-DOWN messages may be processed. Once the allocated portion is exhausted, the scheduler algorithm moves to step 306.

At step 306, once the messages of the last class (e.g., TEAR-DOWN messages) are processed, the algorithm processes other messages or performs other types of packet network processing during the remaining portion of allocated processing capacity. Then, when the remaining portion is exhausted, the scheduling algorithm returns from step 306 to step 301.

Exemplary embodiments of the present invention may be simulated and compared with a simple and useful FIFO scheduling method of the prior art. For the exemplary simulations described below with respect to FIGS. 4A–7, a large number of sources and destinations exchange RSVP messages, with the characteristics of each reservation request varying. Other tasks that the processing section may perform, such as routing table recalculations, are accounted for in reserved processing capacity. The relative service times for RSVP message processing of the simulations were the same as those measured in existing network distributions of RSVP software.

Figure 4B:
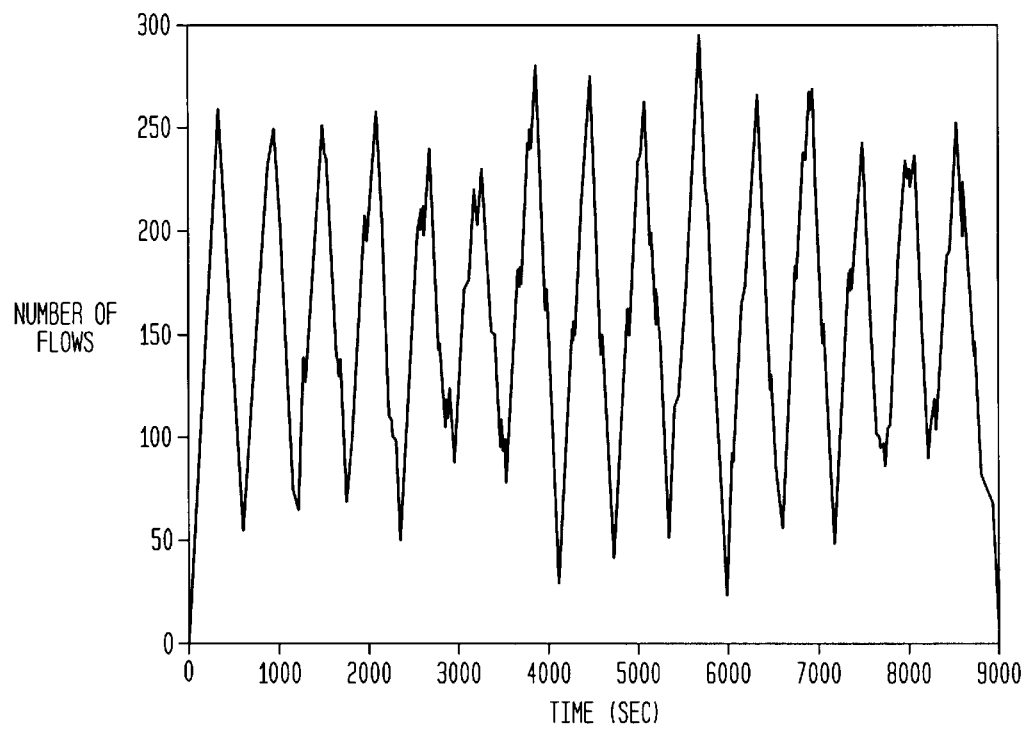
FIG. 4B shows a number of flows for relatively high processor load without router refresh timer expiration in accordance with a scheduling algorithm of the prior art.

FIGS. 4A and 4B show a number of packet flows for low and high message processing load cases, respectively, presented to the processing section of a router in accordance with a FIFO scheduling method of the prior art having a disabled refresh timer. FIFO processing for PATH, RESV, and UPDATE messages is employed in the simulations of FIGS. 4A and 4B, and explicit TEAR-DOWN messages are given absolute priority. Not processing TEAR-DOWN messages in a FIFO manner and giving absolute priority releases link capacity (decreases link utilization) and reduces the chance of other requests being blocked. Message request size may be the same for all reservation message classes (i.e., models a scenario with many flows of same type). Connection or call holding time is defined as 300 seconds, message processing time is on the order of 100 ms, and TEAR-DOWN message processing time is two or three times higher than the PATH and RESV message processing times.

Link utilization, expressed in number of packet flows since message request size is defined as a constant size, is shown in FIGS. 4A and 4B as a function of time for the two cases of processor utilization (low processor load and high processor load). For the high processor load case shown in FIG. 4B, the load offered is below capacity without TEAR-DOWN messages. Once TEAR-DOWN messages are included the load often exceeds available processing capacity. For the cases of the exemplary embodiment of FIGS. 4A and 4B, the refresh timer is disabled such that it does not expire, and the link utilization of the router is shown to be unsatisfactory.

Referring to FIG. 4A, initially, when the number of packet flows is not very large, the processing load is low enough that many flows are successfully established. Note that to establish a packet flow, both its PATH and RESV message must be successfully processed. As the number of flows increases, the UPDATE message traffic increases proportionally and, hence, increases processor load. The number of established packet flows continues to increase. In addition, some of the established packet flows start generating TEAR- DOWN messages, since their holding times have elapsed. Because TEAR-DOWN messages are given priority, the number of packet flows in progress decreases.

When the number of packet flows has decreased sufficiently, the arrival rate of TEAR-DOWN messages decreases sufficiently such that new packet flows are established at a faster rate than the rate at which packet flows are terminated or torn down. Hence, the number of packet flows increases again. After a delay, equal to the message holding time, TEAR-DOWN messages are generated again and the number of flows (and hence link utilization) goes down. This oscillation in packet flow of FIG. 4A is more pronounced at high message load, such as is shown in the simulation results of FIG. 4B.

Figure 5A:
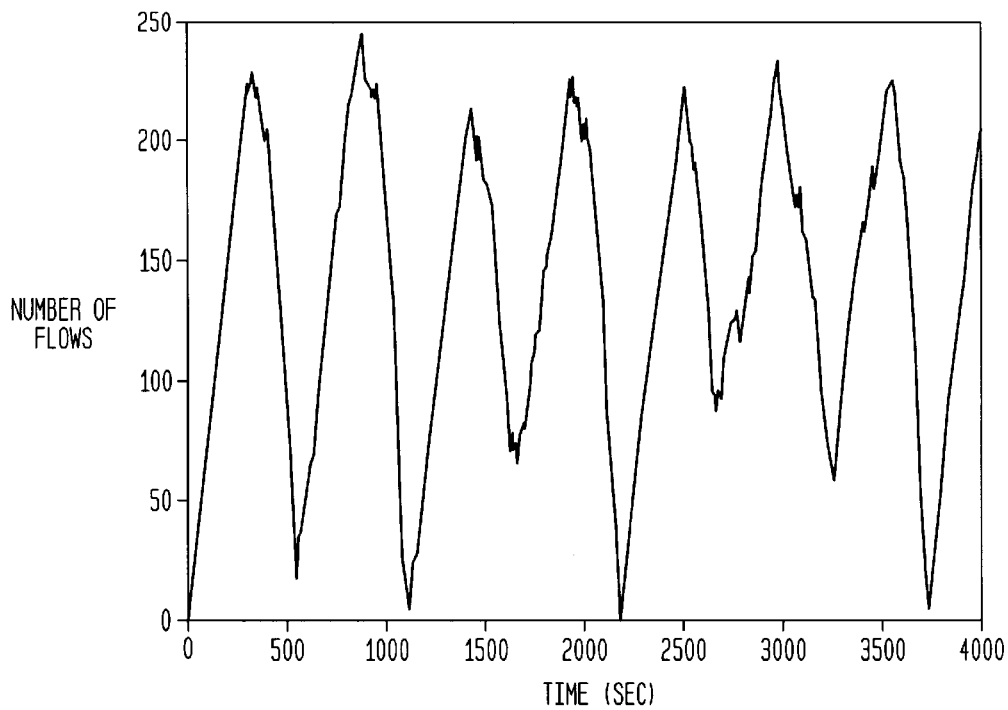
FIG. 5A shows a number of flows for relatively low processor load with router refresh timer expiration in accordance with a scheduling algorithm of the prior art.
Figure 5B:
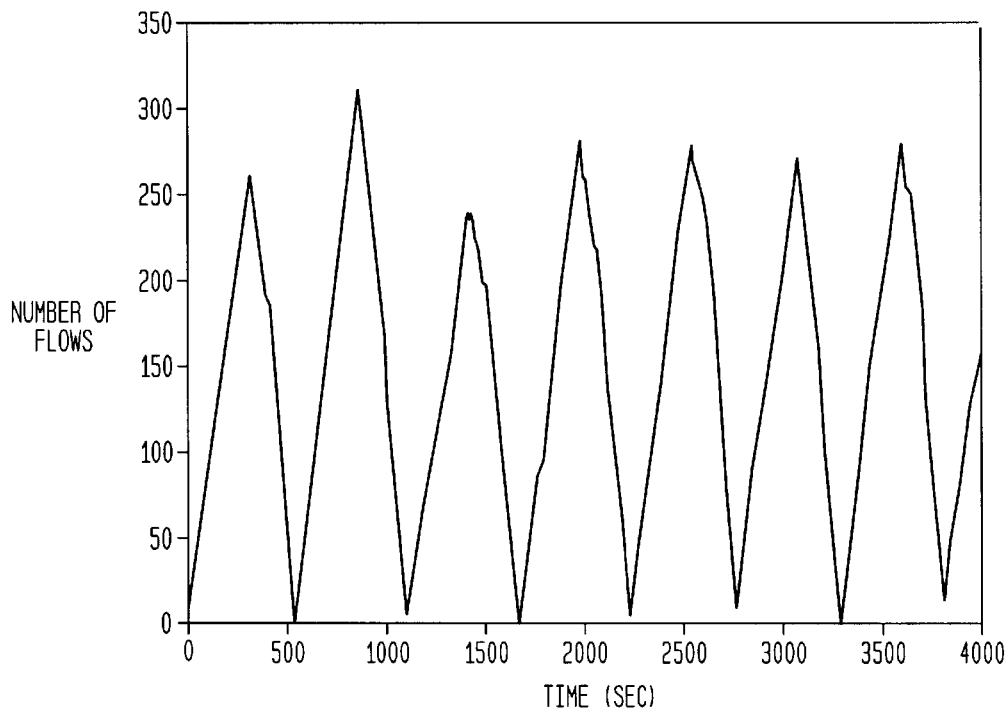
FIG. 5B shows a number of flows for relatively high processor load with router refresh timer expiration in accordance with a scheduling algorithm of the prior art.

FIGS. 5A and 5B show a number of packet flows for low and high message processing load cases, respectively, presented to the processing section of a router in accordance with a FIFO scheduling method of the prior art with a refresh timer enabled. The oscillation in packet flow is similar to that shown in FIGS. 4A and 4B. Extreme oscillation in packet flow occurs in both cases shown in FIGS. 5A and 5B. Since UPDATE messages are processed in a FIFO manner, UPDATE messages are queued and are significantly delayed, or lost, if the queue (buffers) is not large. Delaying queued UPDATE messages causes the refresh timer to expire even if set to a value an order of magnitude greater than end-to-end packet round-trip times.

Figure 6:
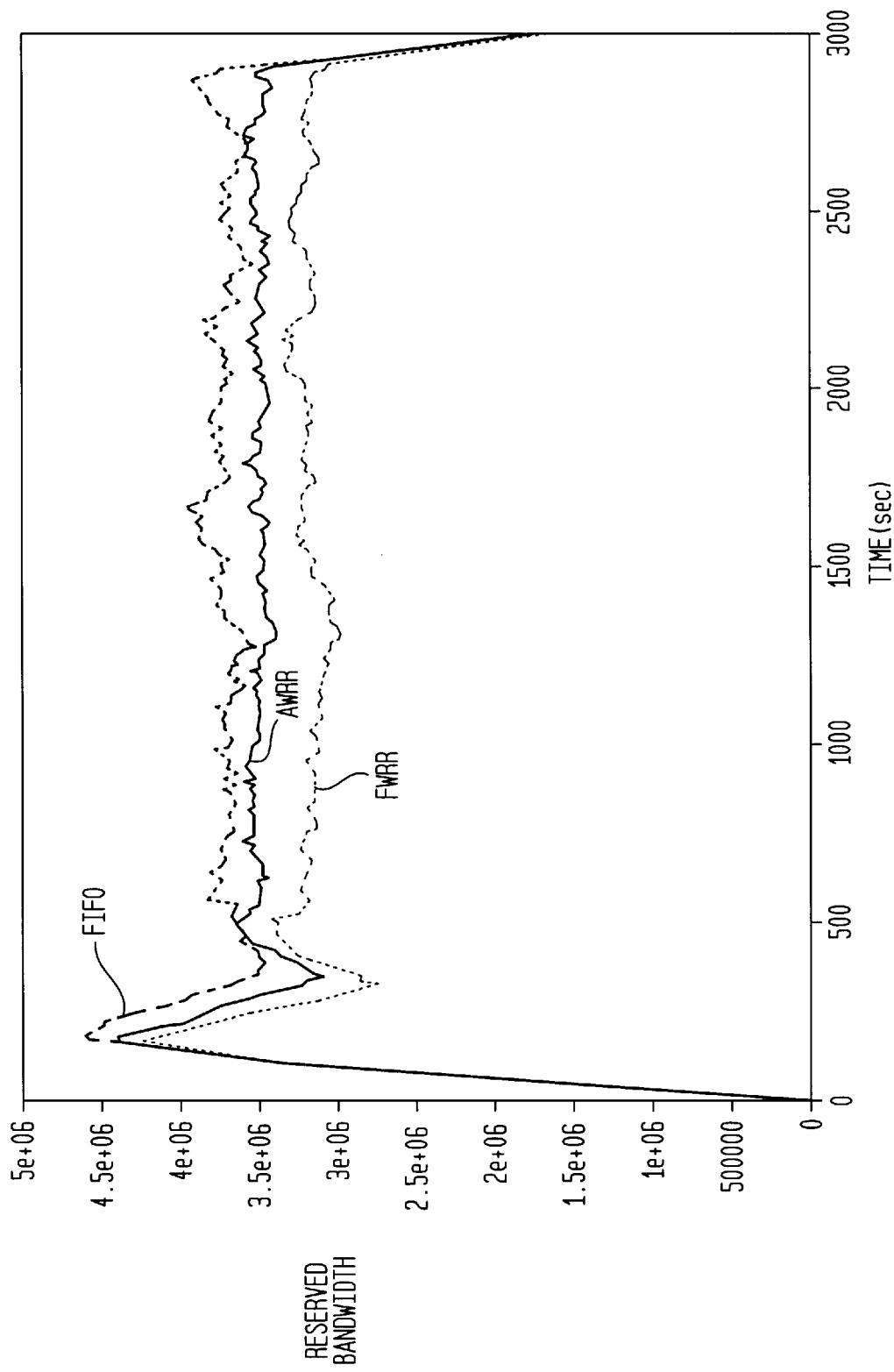
FIG. 6 shows simulation results of a moderately loaded processor employing an adaptive scheduling method in accordance with an exemplary embodiment of the present invention.

FIG. 6 shows simulation results for a moderately loaded processing section employing a round-robin scheduling method with both fixed weighting assignment and adaptive weighting assignment in accordance with an exemplary embodiment of the present invention. The simulation results for the round-robin scheduling method with fixed weights are labeled FWRR, and have weights chosen to be proportional to service times. The simulation results for the round-robin scheduling method with adaptive weight assignment in accordance with the present invention are labeled AWRR. Also shown in FIG. 6 are results of the FIFO scheduling method of the prior art under moderate processing load.

For the simulation results shown in FIG. 6, and FIG. 7 described subsequently, all reservation message request sizes are between 1 and 5 kbits/s; the mean call holding time is 180 seconds; and the inter-arrival times of the message requests follow an exponential distribution. For the exemplary simulations, the greatest number of bandwidth reservation requests are for small bandwidth reservation (e.g. for audio conferences of about 64 kb/sec). In addition, some sources generate requests for much larger bandwidth reservation (e.g., for video servers or video conferencing systems).

As shown in the simulation results of FIG. 6, the bandwidth reserved for each scheduling method is plotted as a function of time. Since the processor load is moderate, the effect of scheduling is not very pronounced and the reserved bandwidth is actually somewhat higher for the FIFO scheduling method.

However, the higher reserved bandwidth of the FIFO scheduling method is because TEAR-DOWN messages are delayed and processed later. Consequently, reserved bandwidth of the FIFO scheduler is wasted because the receiver or sender initiated connection tear-down that terminates bandwidth usage by the packet flow has not been processed. Both the FWRR and, in particular, the AWRR scheduling methods reclaim the reserved bandwidth faster, and hence reserved bandwidth of the FWRR and WRR methods appears lower than that of FIFO scheduling method.

However, more spurious connection terminations occur for the FIFO scheduling method because UPDATE messages are not processed before expiration of the corresponding refresh timer. The number of spurious terminations is smaller for the FWRR scheduling method and is lowest for the AWRR scheduling method, showing the advantage of adaptive weighting assignment for scheduling of processor capacity in accordance with the present invention.

Figure 7:
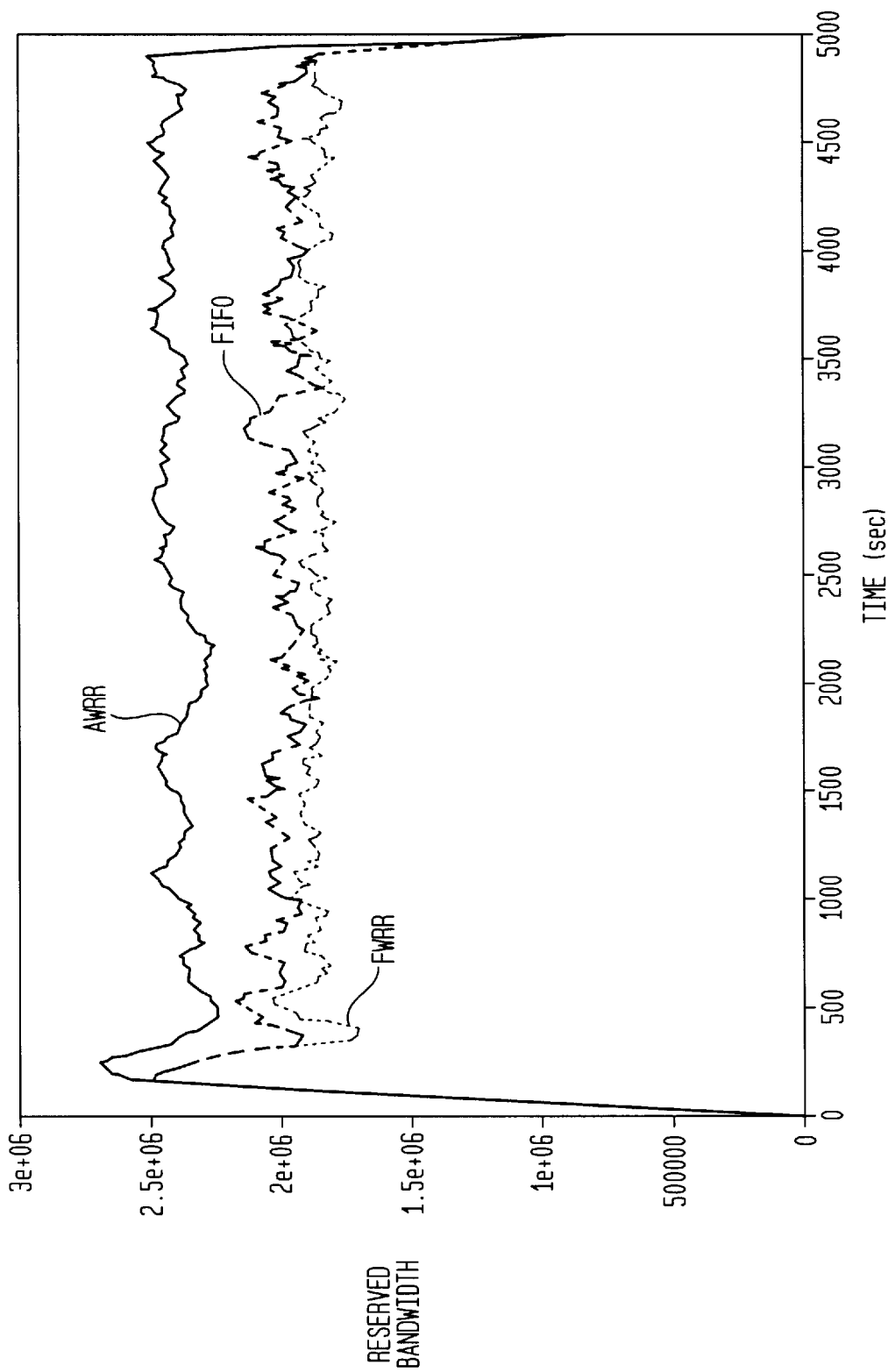
FIG. 7 shows simulation results for the system of FIG. 6 modified to allocate a relatively high portion of processing resources to route processing.

FIG. 7 shows simulation results for a simulation system similar to that of FIG. 6 but with an added high-processing load due to route processing by the router's processing section. Total processing load is, therefore, much higher even though the offered load due to RSVP messages is the same. The results of the round-robin scheduling method with fixed weights are labeled FWRR, the results of the round-robin scheduling method with adaptive weight assignment in accordance with the present invention are labeled AWRR, and the results of the FIFO scheduling method of the prior art are labeled FIFO.

When the processing load increases, the advantages of the AWRR scheduling method are shown for processing a number of flows in progress, and for reserved bandwidth. As shown in the simulation results of FIG. 7, the AWRR scheduling method is effective, for example, in extreme cases where reserved bandwidth is very low and when the reserved bandwidth reaches the maximum link bandwidth utilization. For the first case where reserved bandwidth is very low, a number of accepted reservations increases. For the second case where reserved bandwidth reaches a maximum, the number of established, or accepted, connections is maximized since reserved bandwidth of terminated connections is freed faster than with the FWRR scheduling method.

A router employing a round-robin scheduling method with adaptive weighting assignment in accordance with the present invention for processing of message classes allows for five desirable processing features when a reservation-based protocol is employed in a packet network. First, refresh messages (UPDATE messages) generally require at least a fraction of the available bandwidth, and this fixed fraction may be made an increasing function of the number of packet flows in progress. An upper bound may be determined so as to maintain a minimum bandwidth available for other message types. Second, when link utilization is low, reservation message requests for establishing a connection (e.g., PATH and RESV messages) may be assigned a higher weight since delay of TEAR-DOWN processing generally does not adversely impact request blocking. However, when link utilization is high, processing of termination messages (e.g., TEAR-DOWN messages) may be given a higher weight since processing PATH or RESV messages before processing of TEAR-DOWN messages may result in the bandwidth request fore each PATH or RESV message being denied.

Third, assigned weights may be adjusted based on the size of average recent packet flow establishment and termination requests. For example, if reservations are small and link utilization is low, then the weight assigned to RESV messages may be increased since processing of each message has a much smaller impact on the link utilization. Similarly if average recent flow establishment and termination requests sizes are large, then the weights for reservations may be scaled down. Fourth, processing time for each message type, if known, may be accounted for in assigning weights. Fifth, instantaneous queue-lengths by message type may be employed to control queue lengths in extreme situations when the link is totally over-utilized or totally under-utilized.

While the exemplary embodiments of the present invention have been described with respect to processing method, the present invention is not so limited. As would be apparent to one skilled in the art, various functions may also be implemented in the circuits or a combination of circuits and in digital domain as processing steps in a software program of, for example, a micro-controller or general purpose computer.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A processing section of a router for processing control messages in a packet network, the processing section comprising:
    a monitoring module adapted to monitor a link utilization value of a link coupled to the router;
    a processor to calculate a message request size and a corresponding weight for at least one class of control messages, each weight calculated based on the link utilization value and each message request size; and
    a scheduling module adapted to allocate, for each class of control messages, a portion of the processing capacity of the processing section based on the corresponding weight of the class.

2. The invention as recited in claim 1, wherein the control messages further include an update message class of control messages for maintaining at least one established packet flow of the link, and the processor further calculates the weight for the update message class based on the number of established packet flows of the link.

3. The invention as recited in claim 2, wherein the control messages are in accordance with a reservation-based protocol, and the control messages include a first class of control messages for establishing at least one packet flow of the link and a second class of control messages for terminating at least one packet flow of the link.

4. The invention as recited in claim 2, wherein the message request size is based on an average of a requested link characteristic of the control messages.

5. The invention as recited in claim 4, wherein the requested link characteristic of the control messages is either bandwidth, transmission delay, or probability of lost packet.

6. The invention as recited in claim 1, wherein:
    the monitoring module further monitors link utilization values for two or more links coupled to the router;
    the processor further calculates, for each link, a message request size and corresponding weight for each class of control messages based on the link utilization of the link, the processor further adapted to calculate a super-class weight for each link; and
    the scheduling module allocates the processing capacity of the processing section to each link based on the corresponding super-class weight, and allocates a portion of the processing capacity allocated to the link to each class of the link based on the corresponding weight of the class.

7. A method for allocating processing capacity to control messages received by a router in a packet network, the method comprising the steps of:
    a) monitoring a link utilization value of a link coupled to the router;
    b) calculating a message request size and a corresponding weight for at least one class of control messages, each weight calculated based on the link utilization value and each message request size; and
    c) allocating, for each class of control messages, a portion of the processing capacity of the router based on the corresponding weight of the class.

8. The method as recited in claim 7, wherein the control messages further include an update message class of control messages for maintaining at least one established packet flow of the link, and the calculating step b) further includes the step of b1) calculating the weight for the update message class based on the number of established packet flows of the link.

9. The method as recited in claim 8, wherein, for the calculating step b), the control messages are in accordance with a reservation-based protocol, and the control messages include a first class of control messages for establishing at least one packet flow of the link and a second class of control messages for terminating at least one packet flow of the link.

10. The method as recited in claim 8, wherein, for the calculating step b), the message request size of a class is calculated based on an average of a requested link characteristic of the control messages.

11. The method as recited in claim 10, wherein, for the calculating step b), the requested link characteristic is either bandwidth, transmission delay, or probability of lost packet.

12. The method as recited in claim 7, wherein:
    the monitoring step a) further includes the step of a1) monitoring link utilization values for two or more links coupled to the router;
    the calculating step b) further includes the steps of b2) calculating, for each link, a message request size and corresponding weight for each class of control messages based on the link utilization of the link, and b3) calculating a super-class weight for each link; and
    the allocating step c) further includes the step of c1) allocating the processing capacity to each link based on the corresponding super-class weight, and c2) allocating a portion of the processing capacity allocated to the link to each class of the link based on the corresponding weight of the class.

13. A router of an IP packet network having a processing section for processing control messages in accordance with a reservation-based protocol, the processing section comprising:
    a monitoring module adapted to monitor a link utilization value of a link coupled to the router;
    a processor adapted to calculate a message request size and a corresponding weight for at least one class of control messages, each weight calculated based on the link utilization value and each message request size; and
    a scheduling module adapted to allocate, for each class of control messages, a portion of the processing capacity of the processing section based on the corresponding weight of the class.

14. The invention as recited in claim 13, wherein the control messages further include an update message class of control messages for maintaining at least one established packet flow of the link, and the processor further calculates the weight for the update message class based on the number of established packet flows of the link.

15. The invention as recited in claim 14, wherein:
    the monitoring module further monitors link utilization values for two or more links coupled to the router;
    the processor further calculates, for each link, a message request size and corresponding weight for each class of control messages based on the link utilization of the link, the processor further adapted to calculate a super-class weight for each link; and the scheduling module allocates the processing capacity of the processing section to each link based on the corresponding super-class weight, and allocates a portion of the processing capacity allocated to the link to each class of the link based on the corresponding weight of the class.

* * * * *